US009482442B1

(12) United States Patent
Mengle et al.

(10) Patent No.: US 9,482,442 B1
(45) Date of Patent: Nov. 1, 2016

(54) DECISION DASHBOARD BALANCING COMPETING OBJECTIVES

(71) Applicants: Saket Mengle, Medford, MA (US); Beth Teresa Logan, Cambridge, MA (US); Misha Natan Sidorsky, Cambridge, MA (US); Willard Simmons, Boston, MA (US)

(72) Inventors: Saket Mengle, Medford, MA (US); Beth Teresa Logan, Cambridge, MA (US); Misha Natan Sidorsky, Cambridge, MA (US); Willard Simmons, Boston, MA (US)

(73) Assignee: DataXu, Inc., Boston, MA (US)

( * ) Notice: Subject to any disclaimer, the term of this patent is extended or adjusted under 35 U.S.C. 154(b) by 0 days.

(21) Appl. No.: 14/695,883

(22) Filed: Apr. 24, 2015

(51) Int. Cl.
| | |
|---|---|
| G05B 15/00 | (2006.01) |
| G05B 21/00 | (2006.01) |
| G05D 23/00 | (2006.01) |
| G01M 1/38 | (2006.01) |
| G06G 7/48 | (2006.01) |
| G01R 21/00 | (2006.01) |
| G01K 1/08 | (2006.01) |
| G06Q 10/00 | (2012.01) |
| F24F 11/00 | (2006.01) |
| G05B 15/02 | (2006.01) |
| G06F 3/0484 | (2013.01) |
| G06F 3/0482 | (2013.01) |

(52) U.S. Cl.
CPC ............. *F24F 11/006* (2013.01); *G05B 15/02* (2013.01); *G06F 3/0482* (2013.01); *G06F 3/04842* (2013.01); *G06F 3/04847* (2013.01)

(58) Field of Classification Search
CPC ........ G06F 8/34; G06Q 30/02; G06Q 40/06; G06Q 50/06; G06Q 50/08; G05B 11/01; G05B 15/00; G05B 15/02; G05B 17/02; G05D 22/02; G05D 27/02; F28F 27/00; H02J 3/14; H04L 67/10
USPC ........................ 702/60; 705/7.12; 348/222.1; 340/12.32; 165/11.1; 703/8
See application file for complete search history.

(56) References Cited

U.S. PATENT DOCUMENTS

| | | |
|---|---|---|
| 6,085,216 A | 7/2000 | Huberman et al. |
| 8,117,067 B2 | 2/2012 | Ketchum |
| 8,374,912 B2 | 2/2013 | Paroz et al. |

(Continued)

OTHER PUBLICATIONS

"Using Flexible Bid Strategies", AdWords Help, http://web.archive.org/web/20131229065847/https://support.google.com/adwords/answer/. . . , 8 pages, printed on Feb. 18, 2015, Google.

(Continued)

*Primary Examiner* — Mohammad Ali
*Assistant Examiner* — Md Azad
(74) *Attorney, Agent, or Firm* — Parker Ibrahim & Berg LLC; James M. Behmke; Kenneth J. Heywood

(57) ABSTRACT

A decision dashboard system to balance competing objectives in a control system suggests control parameter settings for the control system based on specified weights for the competing objectives. For example, given a target amount of energy consumption for a campus-wide, heating, ventilation, and air conditioning (HVAC) control system, providing an optimal amount of climate control to the different campus locations may compete against the length of time climate control is provided to each of the locations. In some aspects, sets of control system settings may be used to predict outcomes based on a history of control parameter settings and measurements from the control system. In further aspects, the predicted outcomes and their associated control parameter settings may be mapped to different weights for the competing objectives and displayed in a graphical user interface.

26 Claims, 8 Drawing Sheets

(56) References Cited

U.S. PATENT DOCUMENTS

| | | |
|---|---|---|
| 8,639,392 B2 | 1/2014 | Chassin |
| 8,756,024 B2 | 6/2014 | Hedley et al. |
| 8,799,078 B1 | 8/2014 | Kniaz |
| 2001/0030664 A1 | 10/2001 | Shulman et al. |
| 2002/0143682 A1 | 10/2002 | Bergmann et al. |
| 2007/0043478 A1* | 2/2007 | Ehlers et al. ............... 700/276 |
| 2010/0070089 A1 | 3/2010 | Harrod et al. |
| 2010/0138363 A1 | 6/2010 | Batterberry et al. |
| 2010/0262497 A1 | 10/2010 | Karlsson |
| 2014/0249876 A1 | 9/2014 | Wu et al. |
| 2014/0277761 A1* | 9/2014 | Matsuoka et al. ............ 700/276 |
| 2014/0304086 A1 | 10/2014 | Dasdan et al. |
| 2014/0337125 A1 | 11/2014 | Dalto et al. |
| 2015/0156031 A1* | 6/2015 | Fadell et al. .................. 700/276 |
| 2015/0168933 A1* | 6/2015 | Klein et al. ................... 700/278 |

OTHER PUBLICATIONS

"Using Automatic Bidding", AdWords Help, http://web.archive.org/web/20130207010309/https://support.google.com/adwords/answer/2. . . , 4 pages, printed on Feb. 18, 2015, Google.

* cited by examiner

DECISION DASHBOARD BALANCING COMPETING OBJECTIVES

BACKGROUND

Computerized control systems are used today in a wide array of different industries. For example, a control system may provide control over a heating, ventilation, and air conditioning (HVAC) system of an area of a building, an entire building, or even a campus of buildings. Other example control systems may provide control over industrial automation devices, home automation systems, automotive systems, warehouse management systems, online content selection systems, and the like.

In some cases, a control system may have competing objectives. For example, in the context of an HVAC system, consider a situation in which the energy consumption by the system is to be capped over a certain time period (e.g., the system is limited to consuming only n-number of kilowatts per week). In such a case, a tradeoff may be made between maximizing user comfort (e.g., by providing air conditioning to an ideal temperature) and maximizing the working hours during which HVAC services are provided. In other words, these objectives may be competing, as maximizing user comfort and maximizing the working hours for the system may not be achievable given the energy consumption constraints for the system (e.g., the system may not be able to maintain an ideal temperature during all hours of the day without exceeding the maximum allowed amount of energy consumption).

SUMMARY

According to one or more embodiments of the disclosure, a processing circuit provides a graphical user interface (GUI) to an electronic display. A screen of the GUI includes an input mechanism operable to assign one or more weights to competing objectives for a controlled system. The screen of the GUI further includes an area in which suggested control parameter settings for the controlled system are displayed based on the one or more weights assigned to the competing objectives for the controlled system. The processing circuit receives data indicative of the one or more weights assigned to the competing objectives via the input mechanism of the screen of the GUI. The processing circuit generates a plurality of unique sets of control parameter settings for the controlled system. The processing circuit retrieves a history of control parameter settings used in the controlled system and resulting measurements from the controlled system. The processing circuit predicts outcomes for each of the plurality of unique sets of control parameter settings for the controlled system based on the history of control parameter settings used in the controlled system and resulting measurements from the controlled system. The processing circuit selects an optimal subset of the plurality of unique sets of control parameter settings based on the predicted outcomes and the competing objectives. The processing circuit selects a particular set of control parameter settings from among the optimal subset of the plurality of unique sets of control parameter settings based on the one or more weights assigned to the competing objectives. The processing circuit provides the particular selected set of control parameter settings to the screen of the GUI for presentation as the suggested control parameter settings.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
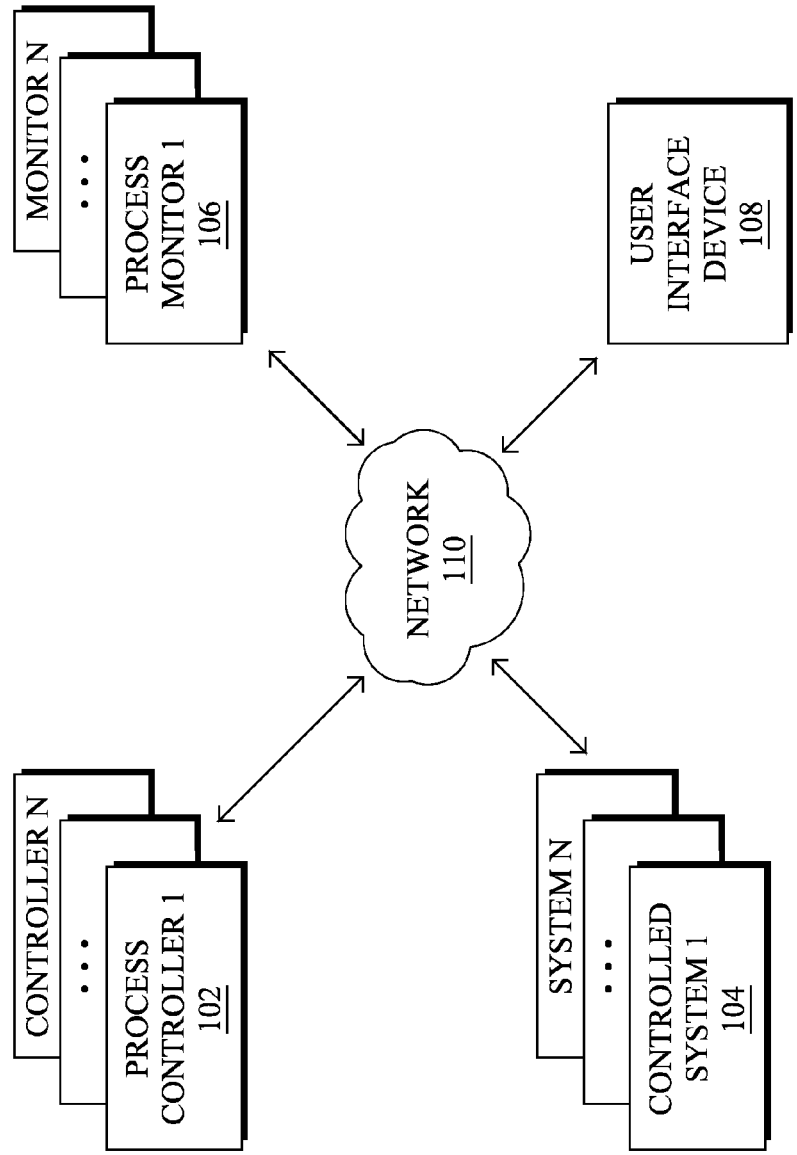
FIG. 1 illustrates an example computer system.

FIG. 1 is a schematic block diagram of an example computer system 100 illustratively comprising any number of devices in electronic communication with one another via a network 110. As shown, system 100 may include one or more process controllers 102 (e.g., a first through nth controller), one or more controlled systems/devices 104 (e.g., a first through nth controlled device), one or more process monitors 106 (e.g., a first through nth process monitor), and/or a user interface device 108. Those skilled in the art will understand that any number of nodes, devices, links, etc. may be used in computer system 100, and that the view shown herein is for simplicity. Also, those skilled in the art will further understand that while the system is shown in a certain orientation, system 100 is merely an example illustration that is not meant to limit the disclosure.

Network 110 may include any number of public networks, private networks, and/or direct connections between devices 102-108. For example, network 110 may include the Internet, one or more wide area networks (WANs), local area networks (LANs), personal area networks (PANs), direct device communication links, combinations thereof, or other forms of data networks. Accordingly, network 110 may include any number of networking devices to facilitate data communications between devices 102-108 in system 100. For example, network 110 may include any number of wireless transceivers, routers, switches, servers, etc., to forward data packets between any of devices 102-108.

Data communications via network 110 may be performed via wired and/or wireless links. For example, user interface device 108 may communicate wirelessly with a cellular substation that is hardwired to a data center that houses process controller 102. In some embodiments, any of devices 102-108 may be integrated together into a singular device, with data communications between the integrated devices being facilitated by a local bus or other communication mechanism. Example communication protocols that may be used in network 110 may include, but are not limited to, cellular protocols (e.g., GSM, CDMA, etc.), wireless protocols (e.g., WiFi, Bluetooth®, etc.), wired protocols (e.g., Ethernet, etc.), transport layer protocols (e.g., TCP, UDP, etc.), Internet layer protocols (e.g., IPv4, IPv6, etc.), or the like.

In various embodiments, system 100 may be configured to provide computerized control over a process or system. Example processes may include, but are not limited to, heating, ventilation, and air conditioning (HVAC) processes, industrial automation processes, online content selection processes, warehouse management processes, automotive system processes, and other processes. Accordingly, controlled system(s)/device(s) 104 may include any number of actuators, computer servers, etc., that may receive control commands from process controller(s) 102 via network 110. For example, if computer system 100 provides control of which online content is provided to an end user device, controlled systems(s)/device(s) 104 may include computer servers that select and/or provide the content to the end user device. In another example, if computer system 100 provides control over an HVAC process, controlled system(s)/device(s) 104 may include any number of chillers, air handling units (AHUs), variable air volume (VAV) box actuators, etc., that regulate the temperature in one or buildings. Similarly, process controller(s) 102 may include servers, programmable logic controllers (PLCs), dedicated controllers, or other devices operable to provide control over controlled system(s)/device(s) 104.

Process controller(s) 102 may use any number of control loops to provide control over controlled system(s)/device(s) 104. In particular, system 100 may include any number of process monitors 106 that monitor the controlled process and provide measurements regarding the controlled process back to process controller(s) 102. For example, if controlled system(s)/device(s) 104 regulate the temperature in an area of a building, process monitor(s) 106 may include a temperature sensor located in the building. In response to such a temperature measurement, process controller(s) 102 may provide one or more control commands to controlled system(s)/device(s) 104, to drive the measured temperature to a setpoint temperature. The control loops may also be dependent or independent, in various embodiments. For example, if the controlled process is providing HVAC services to a campus of buildings, the control loops that provide control over each building may be independent of one another.

User interface device 108 may be any electronic device configured to provide an interface between the controlled process/system and a human user (e.g., an administrator). For example, user interface device 108 may be a portable electronic device (e.g., a tablet, laptop computer, cellular phone, etc.), desktop computing device, or the like. In general, user interface device 108 may include one or more mechanisms to provide sensory information to a human user regarding the process controlled by system 100 and/or receive input from the user, to effect changes in the control strategy. For example, user interface device 108 may include one or more electronic displays to display information regarding the controlled process to the user. Similarly, user interface device 108 may include one or more input mechanisms (e.g., a pointing device, touch screen display, etc.), operable to receive input from the user.

In one embodiment, devices 102-108 may be configured to provide a graphical user interface (GUI) to a display of user interface device 108. Such a GUI may, for example, present current and/or historical information regarding the controlled process to the user. For example, the GUI may present process measurements generated by process monitor(s) 106 regarding the current and/or historical state of the controlled process. Such measurements may be raw measurements or, in other cases, may be aggregated or calculated measurements, such as statistics, etc. The presented GUI may also be operable to allow the user to specify any number of control parameter settings for the controlled process to process controller(s) 102. For example, the GUI may include an input for a temperature setpoint parameter that may be specified by the user to process controller(s) 102 for use as part of the control strategy.

Figure 2:
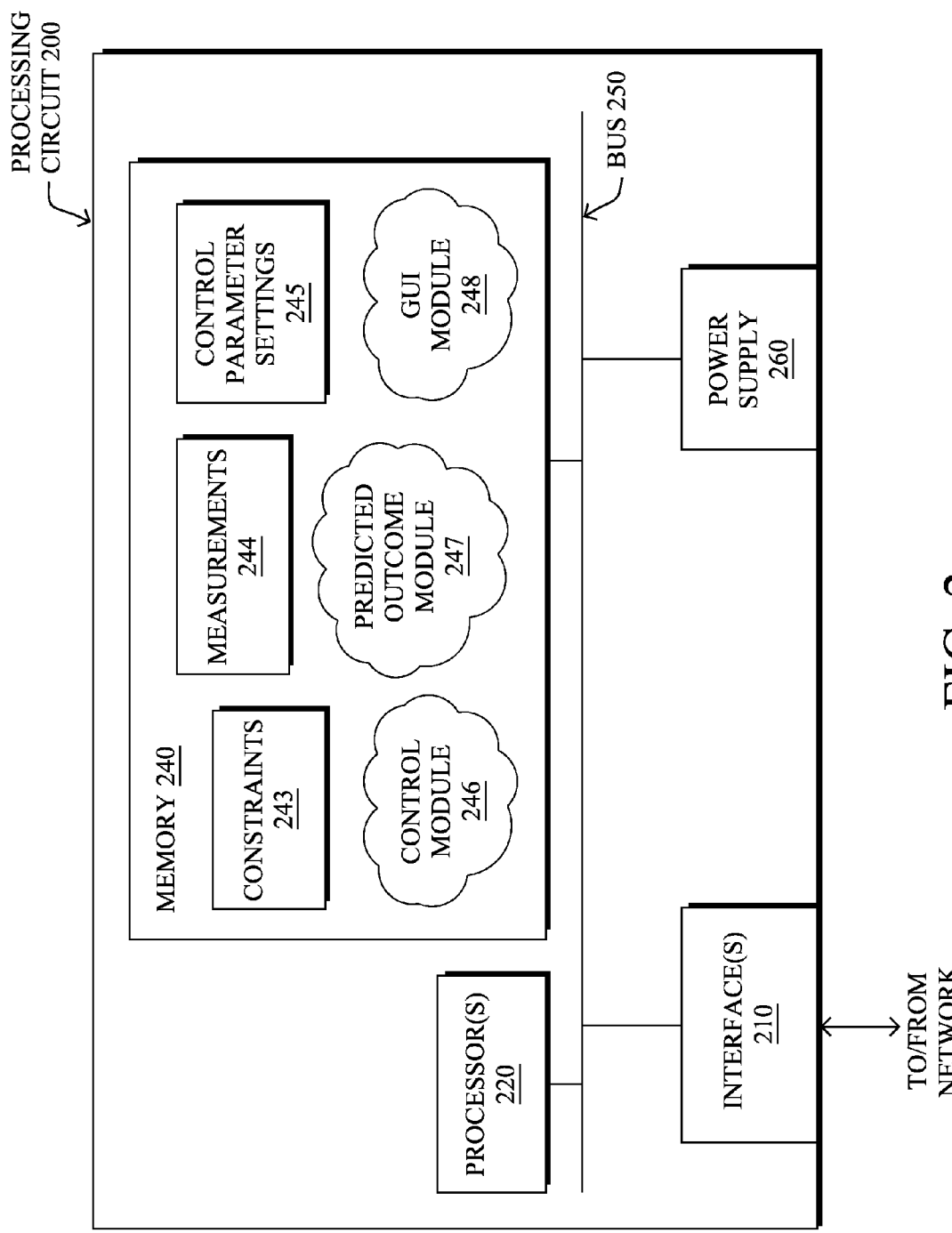
FIG. 2 illustrates an example processing circuit.

FIG. 2 is a schematic block diagram of an example processing circuit 200 that may be used with one or more embodiments described herein, e.g., as any of the devices 102-108 shown in FIG. 1 above. In general, processing circuit 200 may comprise one or more network interface(s) 210 (e.g., wired interfaces, wireless interfaces, etc.), at least one processor 220, and a memory 240 interconnected by a system bus 250, as well as a power supply 260 (e.g., battery, plug-in, etc.).

The network interface(s) 210 may include the mechanical, electrical, and signaling circuitry for communicating data via network 110. The network interfaces may be configured to transmit and/or receive data using a variety of different communication protocols. Note, further, that the nodes may have different types of network connections, e.g., wireless and wired/physical connections, and that the view herein is merely for illustration.

The memory 240 comprises a plurality of storage locations that are addressable by the processor(s) 220 and the network interface(s) 210 for storing software programs and data structures associated with the embodiments described herein. Memory 240 may include, for example, persistent memory (e.g., one or more hard drives, etc.) and/or non-persistent memory (e.g., RAM, etc.) that may store software instructions and associated data for processing by the processor(s) 220. In other words, memory 240 is shown collectively for purposes of illustration and may comprise any number of physical data storage devices.

Processor(s) 220 may comprise hardware elements or hardware logic that execute the software programs stored in memory 240 and manipulate the data stored in memory 240. For example, as shown, memory 240 may store a control module 246, outcome prediction module 247, and/or a GUI module 248 for execution by processor(s) 220. While modules 246-248 are shown separately, the operations of modules 246-248 may be integrated into one another or may be separated into additional modules, as desired. Further, while modules 246-248 are shown stored in memory 240, modules 246-248 may be stored and executed in a distributed manner by any number of different processing circuits, in other embodiments. When executed by processor(s) 220, modules 246-248 may cause processor(s) 220 to store and/or manipulate constraints 243, measurements 244, control parameter settings 245, or other data associated with the operations described herein.

It will be apparent to those skilled in the art that other processor and memory types, including various computer-readable media, may be used to store and execute program instructions pertaining to the techniques described herein. For example, in some cases, memory 240 may comprise a compact disk ROM (CD-ROM), removable storage device, or the like.

In general, control parameter settings 245 may include any number of different parameters and set values that control module 246 may use to control the system/process (e.g., HVAC system, etc.). For example, control parameter settings 245 may include a temperature setpoint specified by a user and received by processing circuit 200 via interface(s) 210. In some embodiments, control parameter settings 245 may also include a history of control parameter settings used by control module 246 to control the process. For example, processing circuit 200 may receive control parameter settings 245 from a user interface device (e.g., device 108) via interface(s) 210.

Measurements 244 may generally include information regarding the measured effects of control parameter settings 245 on the controlled process. In other words, measurements 244 may include data regarding the outcomes of control parameter settings 244 that result in the controlled process. For example, if a particular control parameter setting 245 corresponds to a temperature setpoint, measurements 244 may include measurements regarding the resulting temperature, energy expenditure, etc. of the controlled process/system. Measurements 244 may include raw measurements and/or statistics or other computed values derived therefrom. For example, measurements 244 may include computed averages or other metrics derived from raw measurements received from one or more process monitors (e.g., monitors 106) via interface(s) 210.

Control module 246 includes the executable instructions that, when executed by processor(s) 220, provide control over the controlled process/system (e.g., HVAC, etc.). In various embodiments, control module 246 may be operable to generate and provide control commands based on measurements 244 and control parameter settings 245. For example, processing circuit 200 may receive measurements 244 (e.g., measured temperatures, etc.) and control parameter settings (e.g., a temperature setpoint) via interface(s) 210. In turn, control process 246 may generate and send a corresponding control signal to an HVAC actuator, based on the measured temperature and desired temperature setpoint. In some embodiments, control module 246 may be operable to adjust control parameter settings 245 automatically, to account for variations in the controlled process.

Outcome prediction module 247 includes the executable instructions that, when executed by processor(s) 220, may predict the corresponding outcome on the controlled process for different sets of control parameter settings 245 given constraints 244. In particular, outcome prediction module 247 may use constraints 243, measurements 244, and control parameter settings 245, to generate a solution space that includes unique sets of control parameter settings. In one embodiment, outcome prediction module 247 may determine optimal sets of control parameter settings based on the resource constraints 243 of the controlled system/process.

Constraints 243 may generally include any constraints placed on the optimization functions of outcome prediction module 247. In many controlled systems, resources may be constrained, either by virtue of the nature of the environment or as specified by a user. For example, consider the case of a campus-wide HVAC system. In such a case, example constraints 243 may include energy consumption constraints, indoor temperature/comfort level constraints, working hour constraints, or the like that may be campus-wide, applied at the building level, or even at the sub-area level of the different buildings (e.g., the temperature inside one building cannot fall below a set temperature, etc.). In some cases, constraints 243 may also limit the amount of change that may be applied to the current control strategy over a given amount of time (e.g., the temperature or working hours may only be changed by X % per day, etc.). In various embodiments, constraints 243 may be system constraints due to limitations of the controlled system and/or may be specified by a user. In turn, outcome prediction module 247 may generate sets of control parameter settings 245 that are predicted to optimize the control process given one or more objectives and taking into consideration constraints 243 (e.g., how to maximize user comfort across the campus, given a constrained amount of energy consumption).

GUI module 248 includes the executable instructions that, when executed by processor(s) 220, may provide a GUI for display by a user interface device (e.g., an electronic display of user interface device 108, etc.). Such a GUI, as described in greater detail below, may allow a user to review current and/or historical constraints 243, measurements 244, or control parameter settings 245, to monitor the performance of system 100 on the control process, or otherwise gain further insight into the operation of the controlled process/system. In some embodiments, the GUI may also include various input mechanisms configured to allow the user to specify constraints 243 and/or control parameter settings 245, adjust which systems/processes are controlled, specify objectives for the control system, or provide other information to processing circuit 200. In some embodiments, GUI module 248 may be a decision dashboard that suggests different sets of control parameter settings based on the objectives for the controlled process and given the various constraints that may exist.

Figure 3:
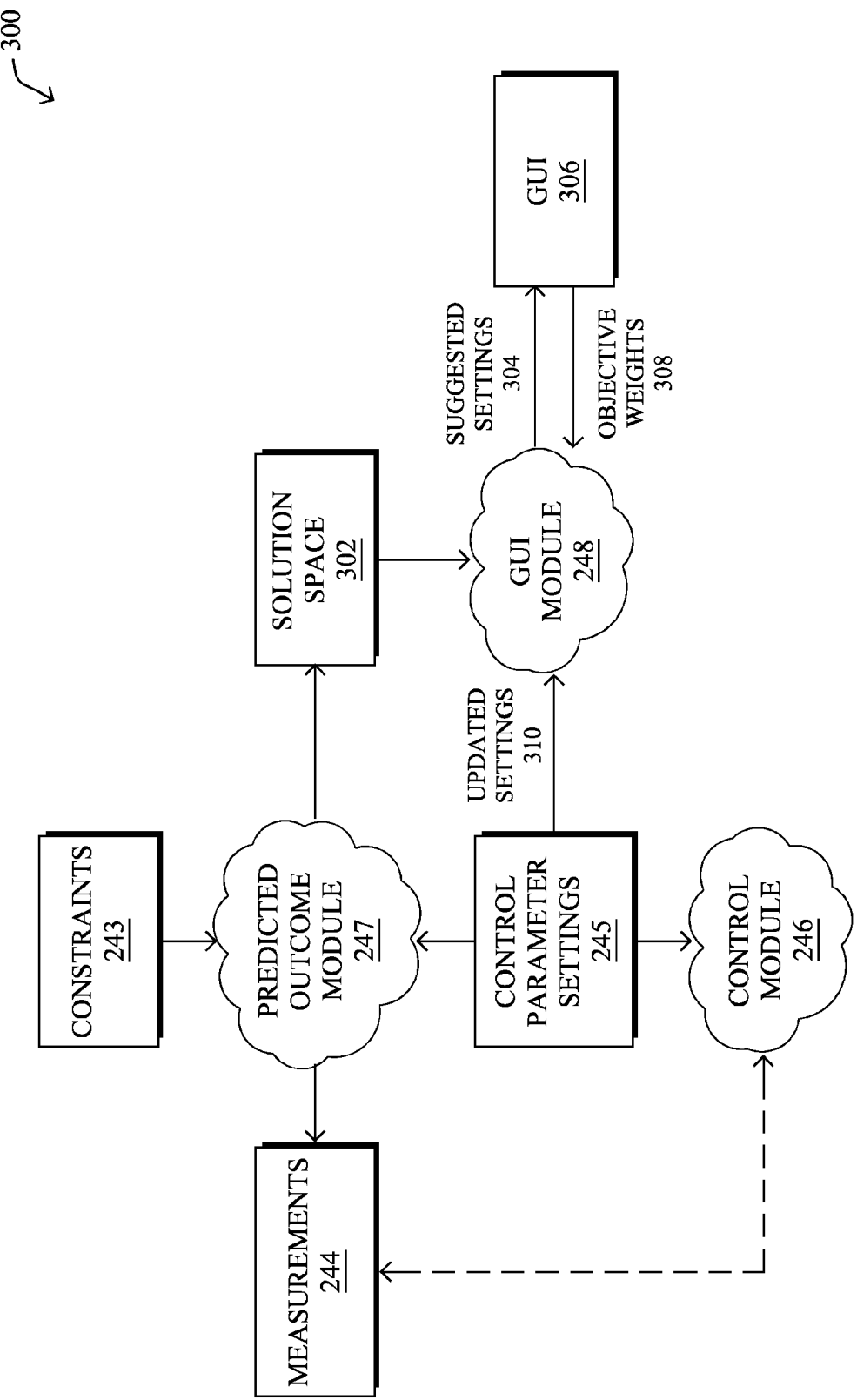
FIG. 3 illustrates an example architecture for proving suggested control parameter settings in a graphical user interface (GUI)

Referring now to FIG. 3, an example architecture 300 is shown for proving suggested control parameter settings in a GUI, according to various embodiments. In general, architecture 300 illustrates the interactions of the modules 246-248 shown in FIG. 2. As would be appreciated, architecture 300 may be modified in other embodiments to include different modules and/or data that perform the same or similar functions as those described herein.

As shown, control module 246 may control a process based on both control parameter settings 245 and the resulting measurements 244 taken from the controlled process. In some cases, the process may be a singular process (e.g., controlling the temperature in a single room) or may be a process that includes any number of sub-processes (e.g., controlling the temperature in different rooms, floors, buildings, etc.).

Outcome prediction module 247 may be operable to generate a solution space 302 based on constraints 243, measurements 244, and control parameter settings 245. In general, solution space 302 may include unique sets of control parameter settings and their associated predicted outcomes. For example, assume that a campus includes buildings A, B, and C. In such a case, solution space 302 may include unique sets of temperature setpoints for the different buildings and their associated/predicted outcomes (e.g., resulting temperatures, energy consumptions, etc.), were the different sets of control parameter settings to be used in the controlled process. In some embodiments, outcome prediction module 247 may generate the data in solution space 302 randomly. In other embodiments, outcome prediction module 247 may generate solution space 302 using Monte Carlo simulation techniques, linear programming techniques (e.g., constrained linear programming, etc.), non-linear programming techniques, simulated annealing, genetic algorithms, randomly, combinations thereof, or by other techniques suitable to generate sets of control parameters settings and associated predicted outcomes for solution space 302.

In various embodiments, GUI module 248 may provide data from solution space 302 to a GUI 306 as suggested control parameter settings 304. For example, GUI module 248 may select one of the unique sets of control parameter settings in solution space 302 as suggested control parameter settings 304 for presentation in GUI 306. GUI 306 may also include one or more input mechanisms that allow the user to accept suggested control parameter settings 304. In such a case, GUI module 248 may store the accepted settings as updated control parameter settings 310 in control parameter settings 245. In turn, control module 246 may use updated control parameter settings 310 to adjust its control over the process/system.

In another embodiment, updated control parameter settings 310 may be specified manually by the user of GUI 306 and may differ from suggested control parameter settings 304. In a further embodiment, updated control parameter settings 310 may be selected automatically by modules 247-248. In such a case, GUI 306 may be operable to allow the user to override any of the automatically selected control parameter settings.

As noted previously, competing objectives may exist for some control systems, particularly when resources available to the control system are limited or otherwise constrained. In particular, certain objectives of a control system may be "competing" in the sense that two or more objectives cannot be maximized or minimized at the same time. Example competing objectives may include, but are not limited to, comfort vs. working hours in an HVAC system having a capped amount of energy consumption, a maximum cost to place online content vs. achievement of a desired effect of the placements (e.g., performance) in an online content selection system, minimizing travel time vs. maximizing fuel efficiency in an vehicle system having a fixed amount of fuel, certainty of an outcome vs. resource cost in a computing system, and the like. In other words, in cases in which the resources of the control system are limited, a balance may be struck when allocating the resources, to provide a tradeoff between the competing objectives.

In some embodiments, GUI 306 may include one or more input mechanisms via which a user may specify one or more objective weights 308 for any competing objectives in the control system. For example, the user may specify via GUI 306 that maximizing the number of working hours of a building (e.g., the hours in which full HVAC services are provided to the building) is slightly more important than providing an ideal level of comfort for the occupants of the building. In one embodiment, GUI module 248 may select and present different sets of suggested control parameter settings 304 from among solution space 302, based on the objective weights 308 specified by the user. In turn, the user may opt to accept or reject the suggested settings for use by the system.

Figure 4:
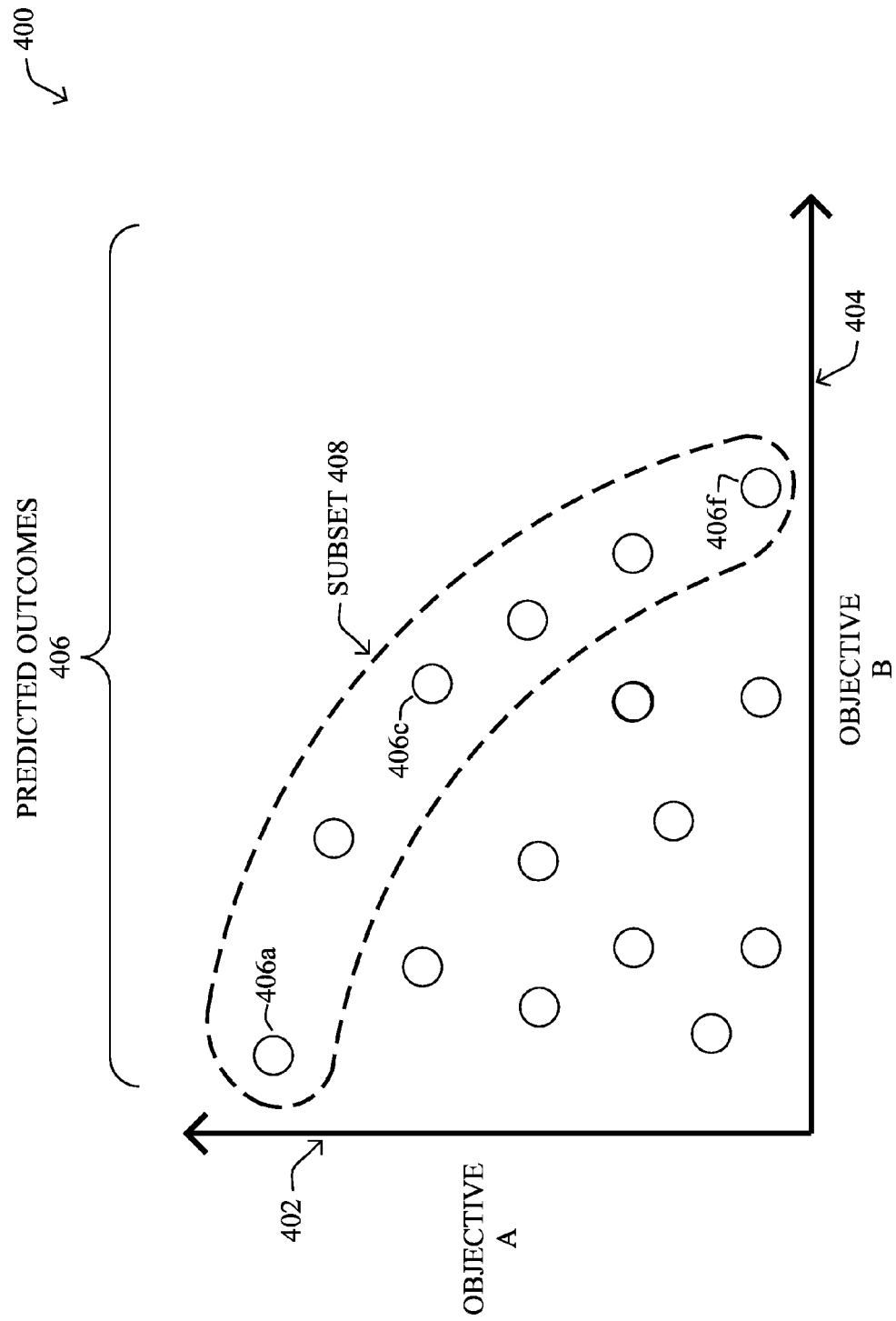
FIG. 4 illustrates an example solution space for predicted outcomes based on different sets of control parameter settings.

Referring now to FIG. 4, an example solution space 400 for predicted outcomes based on different sets of control parameter settings is shown, according to some embodiments. For example, predicted outcomes 406 shown in solution space 400 may be generated by outcome prediction module 247 based on a history of constraints 243, measurements 244, and/or control parameter settings 245.

In general, predicted outcomes 406 may correspond to measurements from the controlled process that are predicted to occur, should a particular set of control parameter settings be used to control the process. Thus, for each predicted outcome 406, there may be an associated set of control parameter settings that are expected to cause the particular outcome. For example, a history of measurements 244 and control parameter settings 245 may indicate that, on average, it will require k-amount of kilowatts of energy consumption per hour to maintain the temperature in a particular building at 72° F. instead of 73° F., j-amount of kilowatts per hour to maintain the temperature at 71° F. instead of 72° F. to, etc. In such a case, the effects of changing a temperature setting on the building's energy consumption may be predicted for any number of different temperature setpoints.

The effectiveness of allocating a certain amount of energy to a particular area of a campus may also vary. For example, a first building may be better insulated and require less energy to maintain a certain temperature than a second building. In such a case, the energy expenditure of the first building may be considered to be more effective than that of the second building. Such effectiveness may be quantified across the different zones and used during the determination of predicted outcomes 406.

There may be both competing objectives for the controlled process, as well as resource constraints. In some embodiments, data sets solution space 400 may be populated using linear programming, such as constrained linear programming. Such a technique generally seeks to determine an optimal result given a set of variable parameters (e.g., control parameters) and any number of constraints. For example, in the HVAC context, outcome prediction module 247 may attempt to allocate energy consumptions optimally to different areas of a campus given an overall energy consumption constraint for the campus, while also taking into consideration the fact that the effectiveness of each allocation may differ across the various areas of the campus. In an additional example, outcome prediction module 247 may also consider further constraints such as how rapidly a control parameter setting may be changed (e.g., a change to the temperature setpoint in a particular building may only be changed one degree per day from the current setpoint), minimum or maximum settings for control parameters (e.g., the temperature on a particular floor cannot fall below a minimum threshold), etc. Once defined, such an optimization problem may be solved by outcome prediction module 247 using the Simplex method or any other linear optimization technique, in some embodiments.

In further embodiments, predicted outcomes 406 and their associated sets of control parameter settings may be determined using non-linear approaches. For example, the optimal allocation of a fixed amount of energy in an HVAC system may be defined as a non-linear problem, in certain cases. In such cases, other non-linear optimization techniques may be used to populate solution space 400. For example, the Broyden-Fletcher-Goldfarb-Shanno (BFGS) method, Nelder-Mead method, or the like, may be used to generate predicted outcomes 406 and their associated sets of control parameter settings. In another embodiment, random sets of control parameter settings may be selected and used to populate solution space 400. In yet other embodiments, solution space 400 may be populated using a Monte Carlo simulation, simulated annealing, genetic algorithms, or other such techniques. A set number of different solutions (e.g., predicted outcomes 406 and their associated sets of control parameter settings) in solution space 400 may also be generated. For example, outcome prediction module 247 may generate five, ten, twenty, etc. different solutions in solution space 400.

Predicted outcomes 406 may be plotted along different axes that represent the different competing objectives for the controlled process. For example, as shown, predicted outcomes 406 may be plotted along a first axis 402 that represents a first objective A and along a second axis 404 that represents a second objective B. In other embodiments, further axes may be added to represent even more competing objectives (e.g., as part of a three- or greater dimensional space).

In some embodiments, an optimal subset 408 of predicted outcomes 406 may be selected based on the competing objectives represented by axes 402-404. For example, assume that objective A corresponds to a climate comfort level in different areas of a campus and objective B corresponds to the working hours for the HVAC systems of the areas. Each of the outcomes 406 and their associated sets of control parameter settings in subset 408 may then be considered to be optimal solutions, depending on how much preference should be given to the different objectives. Thus, the different sets of control parameter settings associated with the members of subset 408 may each be viewed as optimal sets and may be provided to a GUI as suggested control parameter settings. For example, predicted outcome 406a may maximize objective A, but at the greatest expense to objective B. Conversely, predicted outcome 406f may maximize objective B, but at the greatest expense to objective A. In one embodiment, subset 408 may correspond to a Pareto frontier for the predicted outcomes 406.

Figure 5A:
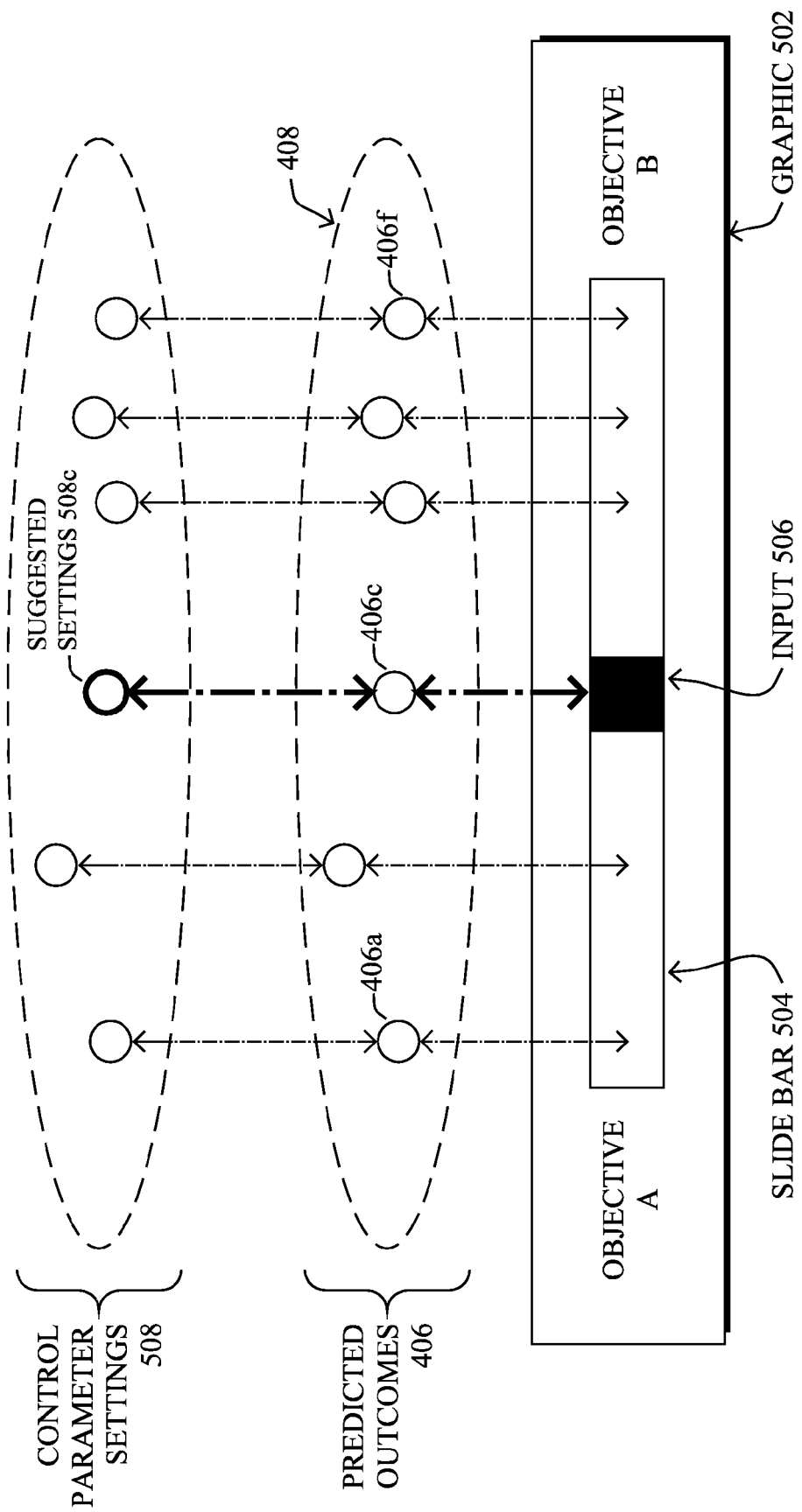
FIGS. 5A-5B illustrate examples of mapping suggested control parameter settings to a GUI graphic.
Figure 5B:
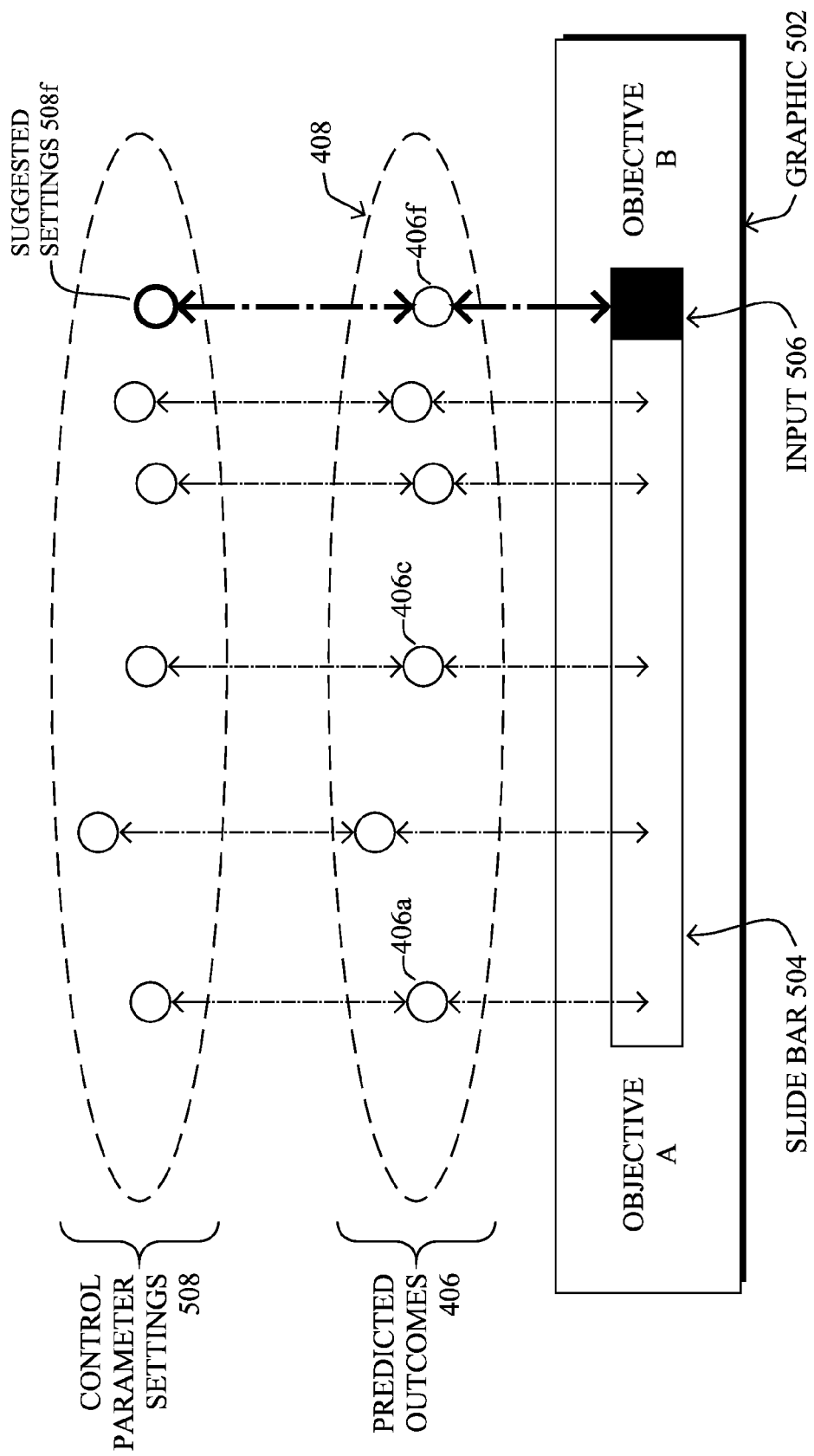

FIGS. 5A-5B illustrate examples of the mapping of suggested control parameter settings to a GUI graphic, according to various embodiments. As shown in FIG. 5A, each of the predicted outcomes 406 in optimal subset 408 may be associated with a corresponding unique set of control parameter settings 508 (e.g., the settings that are expected to result in the predicted outcomes).

In various embodiments, control parameter settings 508 and the predicted outcomes 406 in subset 408 may be mapped to a graphic 502 for presentation as part of a GUI. In particular, each of predicted outcomes 406 in subset 408 may be assigned one or more weights based on the different competing objectives. For example, the coordinates assigned to each of objectives 406 shown in FIG. 4 may be mapped to objective weights. In one embodiment, let $W_A$ represent the weight assigned to objective A and let $W_B$ represent the weight assigned to objective B, where $0 \le W_A \le 1$, $0 \le W_B \le 1$, and $W_A + W_B = 1$. For example, predicted outcome 406a may be assigned weights $W_A = 1$ and $W_B = 0$, predicted outcome 406c may be assigned weights $W_A = 0.5$ and $W_B = 0.5$, predicted outcome 406f may be assigned weights $W_A = 0$ and $W_B = 1$, etc. Other weighting techniques may be used in further embodiments, to indicate the balance between the competing objectives for the controlled process. For example, only a single weight for either objective A or B may be assigned and the weighting for the other objective calculated therefrom.

The weights associated with predicted outcomes 406 in subset 408 may be used to map the outcomes and their associated sets of control parameter settings to corresponding locations along a slider bar 504 in graphic 502. Slider bar 504 may also include an input 506 that may be moved along slider bar 504 based on input from a user interface device. For example, a user may slide input 506 along slider bar 504, to specify and assign weights to each of the competing objectives.

Based on the location of input 506 along slider bar 504 (e.g., signifying the objective weights assigned by the user), different sets of control parameter settings 508 may be selected as suggested control parameter settings 508. For example, as shown in FIG. 5A, assume that the user specifies a balanced approach that applies equal weights to both objectives A and B. In such a case, settings 508c associated with the predicted outcomes 406c may be selected as suggested settings based on the corresponding objective weights specified by the user via input 506. In various embodiments, suggested settings 508c may then be presented to the user as part of the GUI that presents graphic 502 (e.g., on the same screen as graphic 502, on a different screen, etc.).

As shown in FIG. 5B, assume that data is received from the user interface device that indicates that input 506 has been moved along slider bar 504 to the position shown. In other words, the user has assigned the highest weighting to competing objective B. In such a case, outcomes 406f may be selected based on the assigned objective weights and the corresponding set of control parameter settings 508f may be selected as the suggested control parameter settings for the process.

Figure 6:
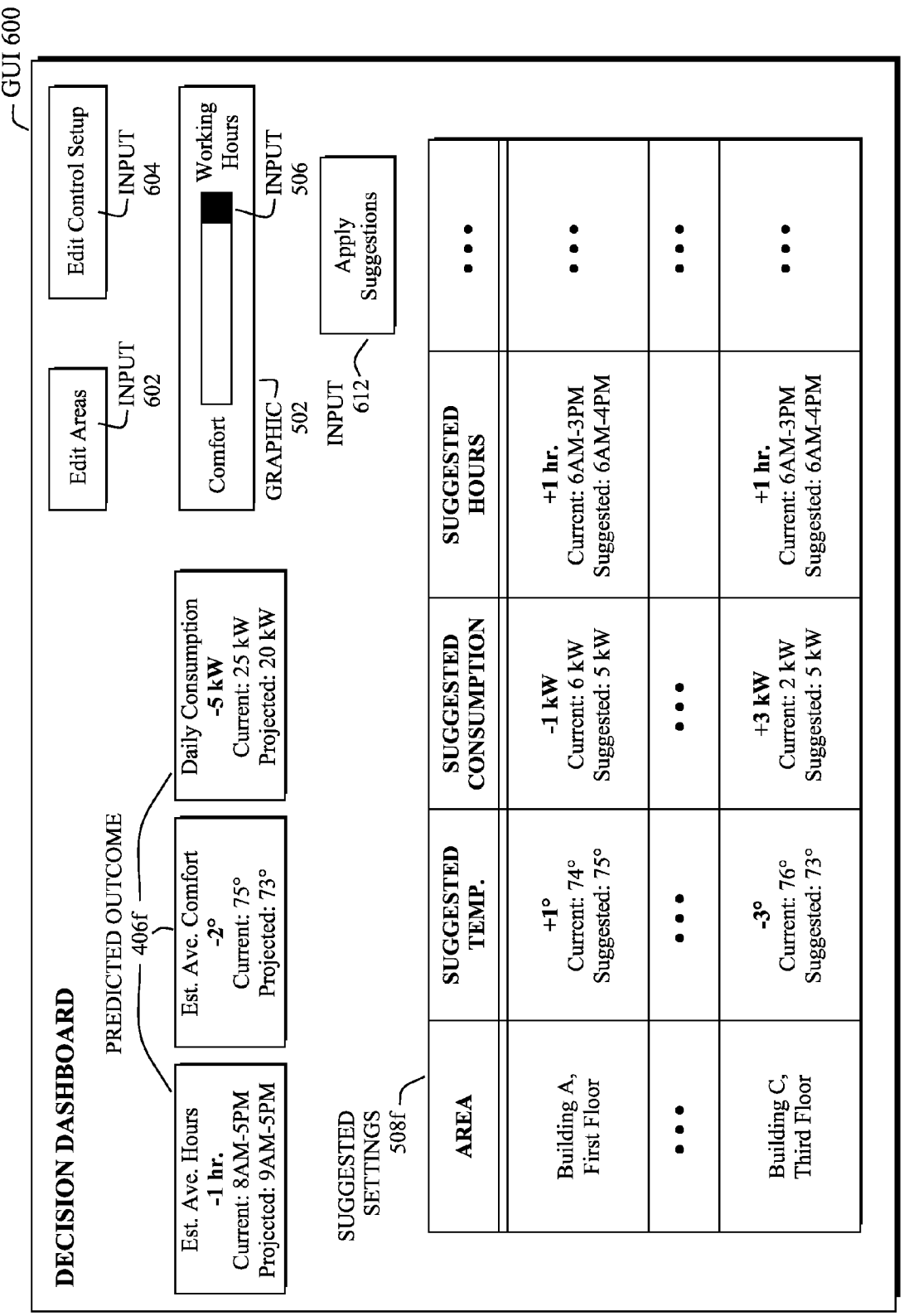
FIG. 6 illustrates an example decision dashboard GUI.

Referring now to FIG. 6, an example decision dashboard GUI 600 is shown, according to some embodiments. As shown, GUI 600 may be provided to a display of a user interface device (e.g., device 108, etc.), to present information to the user regarding the current control parameter settings for the controlled process. In one example, GUI 600 may be operable to allow the user to control an HVAC process/system across different buildings and areas of buildings (e.g., floors, specific rooms, etc.).

In some embodiments, GUI 600 may include a button or other input 602 configured to allow the user of GUI 600 to edit the areas over which the exemplary HVAC system provides HVAC services. For example, selection of input 602 may present one or more additional GUI screens configured to allow the user to define which campus areas are to be provided HVAC services (e.g., to add, remove, or modify the defined areas). GUI 600 may also include an input 604 that, when selected, provides one or more additional GUI screens configured to allow the user to edit the control setup. For example, the user may select input 604 to specify constraints such as the overall amount or rate of energy consumption by the campus, etc.

Continuing the example of FIGS. 5A-5B, GUI 600 may include graphic 502 operable to allow the user of GUI 600 to assign weights to the competing objectives. For example, as shown in FIG. 6, assume that the user has manipulated input 506 to assign the greatest weight to maximizing the working hours of the HVAC areas over that of the comfort level of the areas' occupants. As would be appreciated, while graphic 502 is shown as including a slider bar, other input mechanisms may be used to receive the objective weights, in other embodiments. For example, graphic 502 may instead include a dial, bar chart, etc. In another embodiment, each corresponding weight may be displayed in graphic 502 and presented for selection by the user (e.g., via radio buttons, etc.).

In response to the user of GUI 600 assigning the objective weights via input 506, GUI 600 may be updated to display the corresponding predicted outcomes 406f and suggested control parameter settings 508f for the objective weights assigned via input 506. For example, as shown, for each particular area to which HVAC services are provided, suggested settings 508f may suggest a temperature setpoint, a daily energy consumption, suggested working hours, etc. In addition, GUI 600 may present the current control parameter settings used to control the HVAC process. Also as shown, GUI 600 may display the predicted outcomes 406f based on the objective weights assigned via input 506 that are associated with suggested settings 508f. For example, as shown, predicted outcomes 406f may present the expected changes to the average HVAC working hours across the campus, the average comfort level, the daily energy consumptions, etc., that are predicted to result from suggested control parameter settings 508f.

In some embodiments, GUI 600 may include a confirmation button/input 612 operable to accept suggested control parameter settings 508f as the updated settings for the controlled process. In another embodiment, suggested control parameters 508f may be applied automatically. In a further embodiment, GUI 600 may be operable to receive manual input from the user that overrides any of the suggested control parameter settings 508f.

In an additional embodiment, GUI 600 may include an input mechanism that allows the user to "lock" the control parameter settings for one or more of the different HVAC areas, flights, etc. For example, GUI 600 may include a lock button or the like for each area that, when selected, fix the corresponding settings during the suggestion process. For example, if the current settings for the 1$^{st}$ floor of Building A are "locked," the overall energy consumption for the campus may be adjusted by the consumption by the locked area when computing optimal sets of control parameter settings.

While the techniques herein are illustrated primarily with respect to a campus-wide HVAC system, such examples are provided for exemplary purposes only. Notably, the techniques herein may be applied to other forms of control systems/processes in which there are competing objectives given a constrained amount of resources to be allocated. For example, the techniques herein may also be adapted for use in an online content selection system in which an online content provider may pay for the ability to present certain content to users (e.g., public service announcements, advertisements, etc.). In such a case, the techniques herein may be adapted to provide price guidance for the content placements (e.g., by suggesting control parameters that affect content auction bids, purchases of non-auctioned placements, etc.) by balancing the competing objectives of budget vs. performance.

Figure 7:
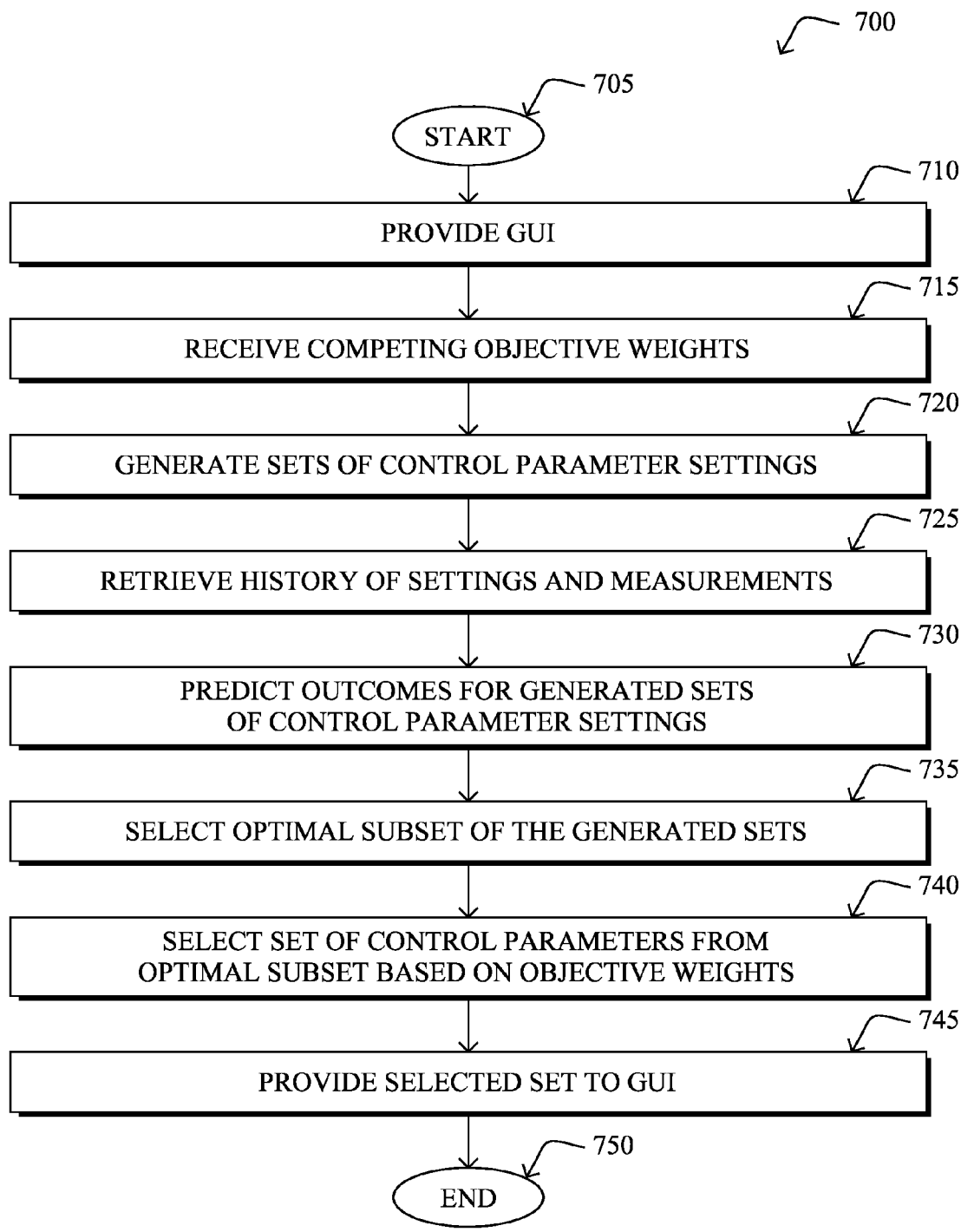
FIG. 7 illustrates an example simplified procedure for providing suggested control parameter settings to a GUI.

FIG. 7 illustrates an example simplified procedure for providing suggested control parameter settings to a GUI, according to various embodiments. In general, procedure 700 may be performed by a processing circuit (e.g., circuit 200) in communication with a user interface device. Procedure 700 may start at step 705 and continue on to step 710 where, as described in greater detail above, the processing circuit may provide a GUI for display by an electronic display of a user interface device. In one embodiment, a screen of the GUI may include an input mechanism operable to assign one or more weights to competing objectives for a controlled system/process. For example, as shown in FIG. 6, GUI 600 may include input 506 via which the user of GUI 600 may assign weights to the competing objectives of maximizing user comfort and maximizing the working hours of the controlled HVAC system. In another embodiment, the screen of the GUI may include an area in which suggested control parameter settings for the controlled system are displayed based on the one or more weights assigned to the competing objectives for the controlled system.

At step 715, the processing circuit may receive data indicative of the one or more weights assigned to the competing objectives via the input mechanism of the screen of the GUI, as detailed above. For example, if there are two competing objectives, the user of the GUI may specify which of the two objectives should be given a greater weighting when control parameter settings are suggested via the GUI.

At step 720, as described in greater detail above, the processing circuit may generate a plurality of unique sets of control parameters for consideration. In one embodiment, the processing circuit may apply one or more constraints when generating the sets of control parameters. For example, as described above, one potential constrain in an HVAC system may correspond to a maximum allowed amount of energy consumption by the system over a set amount of time. The different sets of control parameters may be generated randomly, using linear or non-linear programming techniques based on the constraints, or using other techniques, according to various embodiments.

At step 725, the processing circuit may retrieve a history of control parameter settings used in the controlled system and resulting measurements from the controlled system, as detailed above. For example, the processing circuit may receive, store, and retrieve measurements from the controlled process/system and their corresponding control parameter settings that resulted in the measurements.

At step 730, as described in greater detailed above, the processing circuit may predict outcomes for each of the plurality of unique sets of control parameter settings for the controlled system based on the history of control parameter settings used in the controlled system and resulting measurements from the controlled system. For example, a temperature setpoint used for a particular building may historically result in a corresponding amount of energy consumption by the building's HVAC. In such a case, the processing circuit may use the setpoint and historical energy consumptions to predict future energy consumptions for various temperature setpoints that may be used.

At step 735, the processing circuit may select an optimal subset of the plurality of unique sets of control parameter settings based on the predicted outcomes and the competing objectives, as detailed above. In one embodiment, for example, the optimal subset may be selected along a Pareto frontier with respect to the different competing objectives. In other words, the optimal subset may include the control parameter settings that optimally distribute the constrained resources, but also optimally take into consideration the competing objectives.

At step 740, as detailed above, the processing circuit may select a particular set of control parameter settings from among the optimal subset of the plurality of unique sets of control parameter settings based on the one or more weights assigned to the competing objectives. In particular, as detailed above, while each of the sets in the optimal subset may be optimal solutions from the standpoint of satisfying the constraints, a tradeoff may be made between the competing objectives with respect to these solutions.

At step 745, the processing circuit may provide the particular selected set of control parameter settings to the screen of the GUI for presentation as the suggested control parameter settings, as described in greater detail above. In particular, the suggested control parameter settings may be the set of control parameter settings that are predicted to optimally satisfy the resource constraints on the controlled system/process and give preference to one or more of the competing objectives, as specified by the user via the GUI. Procedure 700 then ends at step 750.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for techniques that allow control parameter settings to be suggested for use by a controlled system/process that has competing objectives and one or more resource constraints. In some aspects, a weighting may be assigned by a user to one or more of the competing objectives via a GUI. In response to the weightings, the system may select suggested control parameter settings that optimally distribute the constrained resources of the control system and in accordance with the weighted objectives.

While there have been shown and described illustrative embodiments, it is to be understood that various other adaptations and modifications may be made within the spirit and scope of the embodiments herein. For example, the embodiments have been shown and described herein with relation to certain network configurations and protocols. However, the embodiments in their broader sense are not as limited, and may, in fact, be used with other types computing/control networks and/or protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    providing, by a processing circuit, a graphical user interface (GUI) to an electronic display, wherein a screen of the GUI includes an input mechanism operable to assign one or more weights to competing objectives for a controlled system, wherein the competing objectives cannot be maximized or minimized at the same time due to a constrained resource, and wherein the screen of the GUI further includes an area in which suggested control parameter settings for the controlled system are displayed based on the one or more weights assigned to the competing objectives for the controlled system;
    receiving, at the processing circuit, data indicative of the one or more weights assigned to the competing objectives via the input mechanism of the screen of the GUI;
    generating, by the processing circuit, a plurality of unique sets of control parameter settings for the controlled system;
    retrieving, by the processing circuit, a history of control parameter settings used in the controlled system and resulting measurements from the controlled system;
    predicting, by the processing circuit, outcomes for each of the plurality of unique sets of control parameter settings for the controlled system based on the history of control parameter settings used in the controlled system and resulting measurements from the controlled system, wherein each predicted outcome corresponds to one or more measurements from the controlled system that are predicted to occur as a result of the controlled system using a particular one of the unique sets of control parameter settings;
    selecting, by the processing circuit, an optimal subset of the plurality of unique sets of control parameter settings based on the predicted outcomes and the competing objectives, wherein the optimal subset of the plurality of unique sets of control parameter settings corresponds to a Pareto frontier;
    selecting, by the processing circuit, a particular set of control parameter settings from among the optimal subset of the plurality of unique sets of control parameter settings based on the one or more weights assigned to the competing objectives; and
    providing, by the processing circuit, the particular selected set of control parameter settings to the screen of the GUI for presentation as the suggested control parameter settings.

2. The method as in claim 1, wherein generating the plurality of unique sets of control parameter settings for the controlled system comprises:
    applying one or more constraints to a solution space of possible control parameter settings.

3. The method as in claim 2, wherein generating the plurality of unique sets of control parameter settings for the controlled system comprises:
    randomly generating different combinations of control parameter settings from the constrained solution space.

4. The method as in claim 2, wherein generating the plurality of unique sets of control parameter settings for the controlled system comprises:
    generating the unique sets of control parameter settings from among the constrained solution space using linear programming.

5. The method as in claim 1, further comprising:
    receiving, at the processing circuit, data regarding the control parameter settings used in the controlled system;
    receiving, at the processing circuit, the measurements from the controlled system that resulted from the control parameter settings being used in the controlled system; and
    storing, in a memory device, the history of control parameter settings used in the controlled system and resulting measurements from the controlled system.

6. The method as in claim 1, further comprising:
    receiving, at the processing circuit, one or more user settings to exclude a particular control parameter setting from consideration; and
    excluding, by the processing circuit, the particular control parameter setting from consideration when suggesting control parameter settings via the screen of the GUI.

7. The method as in claim 1, wherein the input mechanism comprises a slider bar graphic.

8. The method as in claim 1, further comprising:
    setting, by the processing circuit, control parameters of the controlled system to be the suggested control parameter settings, in response to selecting the particular set of control parameter settings from among the optimal subset of the plurality of unique sets of control parameter settings.

9. The method as in claim 1, further comprising:
    setting, by the processing circuit, control parameters of the controlled system to be the suggested control parameter settings, in response to receiving a user command via the GUI.

10. The method as in claim 1, further comprising:
    receiving, at the processing circuit, data indicative of an adjustment made to the one or more weights assigned to the competing objectives via the input mechanism of the screen of the GUI;
    selecting, by the processing circuit, a second set of control parameter settings from among the optimal subset of the plurality of unique sets of control parameter settings based on the adjustment made to the one or more weights assigned to the competing objectives; and providing, by the processing circuit, the second set of control parameter settings to the screen of the GUI for presentation as the suggested control parameter settings.

11. The method as in claim 1, wherein the controlled system comprises a heating, ventilation, and air conditioning (HVAC) system, and wherein the competing objectives comprise energy consumption and a climate comfort level.

12. The method as in claim 1, wherein the controlled system comprises an online content selection system.

13. An apparatus, comprising:
one or more network interfaces to communicate with a computer network;
a processor coupled to the one or more network interfaces and configured to execute a process; and
a memory configured to store the process executable by the processor, the process when executed operable to:
provide a graphical user interface (GUI) to an electronic display, wherein a screen of the GUI includes an input mechanism operable to assign one or more weights to competing objectives for a controlled system, wherein the competing objectives cannot be maximized or minimized at the same time due to a constrained resource, and wherein the screen of the GUI further includes an area in which suggested control parameter settings for the controlled system are displayed based on the one or more weights assigned to the competing objectives for the controlled system;
receive data indicative of the one or more weights assigned to the competing objectives via the input mechanism of the screen of the GUI;
generate a plurality of unique sets of control parameter settings for the controlled system;
retrieve a history of control parameter settings used in the controlled system and resulting measurements from the controlled system;
predict outcomes for each of the plurality of unique sets of control parameter settings for the controlled system based on the history of control parameter settings used in the controlled system and resulting measurements from the controlled system, wherein each predicted outcome corresponds to one or more measurements from the controlled system that are predicted to occur as a result of the controlled system using a particular one of the unique sets of control parameter settings;
select an optimal subset of the plurality of unique sets of control parameter settings based on the predicted outcomes and the competing objectives, wherein the optimal subset of the plurality of unique sets of control parameter settings corresponds to a Pareto frontier;
select a particular set of control parameter settings from among the optimal subset of the plurality of unique sets of control parameter settings based on the one or more weights assigned to the competing objectives; and
provide the particular selected set of control parameter settings to the screen of the GUI for presentation as the suggested control parameter settings.

14. The apparatus as in claim 13, wherein the apparatus generates the plurality of unique sets of control parameter settings for the controlled system by:
applying one or more constraints to a solution space of possible control parameter settings.

15. The apparatus as in claim 14, wherein the apparatus generates the plurality of unique sets of control parameter settings for the controlled system by:
randomly generating different combinations of control parameter settings from the constrained solution space.

16. The apparatus as in claim 14, wherein the apparatus generates the plurality of unique sets of control parameter settings for the controlled system by:
generating the unique sets of control parameter settings from among the constrained solution space using linear programming.

17. The apparatus as in claim 13, wherein the process when executed is further operable to:
receive data regarding the control parameter settings used in the controlled system;
receive the measurements from the controlled system that resulted from the control parameter settings being used in the controlled system; and
store the history of control parameter settings used in the controlled system and resulting measurements from the controlled system in the memory.

18. The apparatus as in claim 13, wherein the process when executed is further operable to:
receive one or more user settings to exclude a particular control parameter setting from consideration; and
exclude the particular control parameter setting from consideration when suggesting control parameter settings via the screen of the GUI.

19. The apparatus as in claim 13, wherein the input mechanism comprises a slider bar graphic.

20. The apparatus as in claim 13, wherein the process when executed is further operable to:
set control parameters of the controlled system to be the suggested control parameter settings, in response to selecting the particular set of control parameter settings from among the optimal subset of the plurality of unique sets of control parameter settings.

21. The apparatus as in claim 13, wherein the process when executed is further operable to:
set control parameters of the controlled system to be the suggested control parameter settings, in response to receiving a user command via the GUI.

22. The apparatus as in claim 13, wherein the process when executed is further operable to:
receive data indicative of an adjustment made to the one or more weights assigned to the competing objectives via the input mechanism of the screen of the GUI;
select a second set of control parameter settings from among the optimal subset of the plurality of unique sets of control parameter settings based on the adjustment made to the one or more weights assigned to the competing objectives; and
provide the second set of control parameter settings to the screen of the GUI for presentation as the suggested control parameter settings.

23. A tangible, non-transitory, computer-readable media having software encoded thereon, the software when executed by a processor operable to:
provide a graphical user interface (GUI) to an electronic display, wherein a screen of the GUI includes an input mechanism operable to assign one or more weights to competing objectives for a controlled system, wherein the competing objectives cannot be maximized or minimized at the same time due to a constrained resource, and wherein the screen of the GUI further includes an area in which suggested control parameter settings for the controlled system are displayed based on the one or more weights assigned to the competing objectives for the controlled system;

receive data indicative of the one or more weights assigned to the competing objectives via the input mechanism of the screen of the GUI;

generate a plurality of unique sets of control parameter settings for the controlled system;

retrieve a history of control parameter settings used in the controlled system and resulting measurements from the controlled system;

predict outcomes for each of the plurality of unique sets of control parameter settings for the controlled system based on the history of control parameter settings used in the controlled system and resulting measurements from the controlled system, wherein each predicted outcome corresponds to one or more measurements from the controlled system that are predicted to occur as a result of the controlled system using a particular one of the unique sets of control parameter settings;

select an optimal subset of the plurality of unique sets of control parameter settings based on the predicted outcomes and the competing objectives, wherein the optimal subset of the plurality of unique sets of control parameter settings corresponds to a Pareto frontier;

select a particular set of control parameter settings from among the optimal subset of the plurality of unique sets of control parameter settings based on the one or more weights assigned to the competing objectives; and provide the particular selected set of control parameter settings to the screen of the GUI for presentation as the suggested control parameter settings.

24. The computer-readable media of claim 23, wherein the software when executed is further operable to:

receive data indicative of an adjustment made to the one or more weights assigned to the competing objectives via the input mechanism of the screen of the GUI;

select a second set of control parameter settings from among the optimal subset of the plurality of unique sets of control parameter settings based on the adjustment made to the one or more weights assigned to the competing objectives; and provide the second set of control parameter settings to the screen of the GUI for presentation as the suggested control parameter settings.

25. The computer-readable media of claim 23, wherein the input mechanism comprises a slider bar graphic.

26. The computer-readable media of claim 23, wherein the software when executed is further operable to:

apply one or more constraints to a solution space of possible control parameter settings; and generate the unique sets of control parameter settings from among the constrained solution space using linear programming.

* * * * *